United States Patent
Chen et al.

(10) Patent No.: US 9,355,233 B1
(45) Date of Patent: May 31, 2016

(54) PASSWORD RESET USING HASH FUNCTIONS

(71) Applicant: Sprint Communications Company L.P., Overland Park, KS (US)

(72) Inventors: Anthony D. Chen, Orlando, FL (US); Christopher J. Maitland, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 142 days.

(21) Appl. No.: 14/165,574

(22) Filed: Jan. 27, 2014

(51) Int. Cl.
*G06F 21/46* (2013.01)
*G06F 21/31* (2013.01)

(52) U.S. Cl.
CPC ..................................... *G06F 21/31* (2013.01)

(58) Field of Classification Search
CPC .................................................... H04L 9/0861
See application file for complete search history.

(56) References Cited

U.S. PATENT DOCUMENTS

| | | | |
|---|---|---|---|
| 4,800,590 A | 1/1989 | Vaughan | |
| 5,588,056 A | 12/1996 | Ganesan | |
| 5,592,553 A | 1/1997 | Guski et al. | |
| 5,661,807 A | 8/1997 | Guski et al. | |
| 6,161,185 A | 12/2000 | Guthrie et al. | |
| 6,178,508 B1 | 1/2001 | Kaufman | |
| 6,470,454 B1 | 10/2002 | Challener et al. | |
| 6,496,937 B1 | 12/2002 | Ichihara | |
| 6,601,175 B1 | 7/2003 | Arnold et al. | |
| 6,731,731 B1 | 5/2004 | Ueshima | |
| 7,836,407 B2 | 11/2010 | Pettinati | |
| 8,331,337 B2 | 12/2012 | Kambe et al. | |
| 8,484,482 B1 | 7/2013 | Cherukumudi et al. | |
| 8,737,965 B2 | 5/2014 | McCown et al. | |
| 8,775,820 B1 | 7/2014 | Freeburne | |
| 9,271,110 B1 | 2/2016 | Fultz et al. | |
| 2002/0052834 A1* | 5/2002 | Fukuda | G06Q 20/10 705/38 |
| 2002/0178370 A1 | 11/2002 | Gurevich et al. | |
| 2005/0015601 A1 | 1/2005 | Tabi | |
| 2005/0175201 A1* | 8/2005 | Herman | G06F 21/31 381/312 |
| 2005/0268345 A1 | 12/2005 | Harrison et al. | |
| 2006/0212589 A1 | 9/2006 | Hayer et al. | |
| 2010/0299729 A1* | 11/2010 | Wallace | G06F 21/33 726/5 |
| 2012/0136572 A1 | 5/2012 | Norton | |
| 2013/0252583 A1 | 9/2013 | Brown et al. | |

OTHER PUBLICATIONS

Fultz, David K., et al., "Location Awareness Session Management and Cross Application Session Management," filed Jul. 9, 2012, U.S. Appl. No. 13/544,802.

(Continued)

*Primary Examiner* — Josnel Jeudy (57) ABSTRACT

Systems and methods disclosed herein may be utilized for resetting passwords to restore access to all or part of a computer system. A user receives a notification that a current password associated is about to expire or has already expired. The notification may comprise a link that, when activated, executes a first hash function on at least one seed of a user profile, for example a time stamp associated with the creation of the current password, to generate a key. The key is sent to the user, the user is prompted to enter the key into, for example, a dialog box. When the entered key is received, a second hash function is executed on the same seed and the result is compared to the entered key. If there is a match, the user is granted access to a part of the system in order to reset their password.

20 Claims, 6 Drawing Sheets

(56) References Cited

OTHER PUBLICATIONS

Office Action dated Jun. 18, 2009, U.S. Appl. No. 11/446,284, filed Jun. 2, 2006.
Final Office Action dated Dec. 1, 2009, U.S. Appl. No. 11/446,284, filed Jun. 2, 2006.
Advisory Action dated Feb. 16, 2010, U.S. Appl. No. 11/446,284, filed Jun. 2, 2006.
Office Action dated Apr. 20, 2010, U.S. Appl. No. 11/446,284, filed Jun. 2, 2006.
Final Office Action dated Aug. 19, 2010, U.S. Appl. No. 11/446,284, filed Jun. 2, 2006.
Examiner's Answer dated Feb. 24, 2011, U.S. Appl. No. 11/446,284, filed Jun. 2, 2006.
Patent Board Decision, Examiner Reversed dated Nov. 22, 2013, U.S. Appl. No. 11/446,284, filed Jun. 2, 2006.
Notice of Allowance dated Feb. 24, 2014, U.S. Appl. No. 11/446,284, filed Jun. 2, 2006.
FAIPP Pre-Interview Communication dated Jan. 2, 2013, U.S. Appl. No. 13/042,015, filed Mar. 7, 2011.
Notice of Allowance dated Mar. 4, 2013, U.S. Appl. No. 13/042,015, filed Mar. 7, 2011.
FAIPP Pre-Interview Communication dated Jan. 22, 2015, U.S. Appl. No. 13/544,802, filed Jul. 9, 2012.
Office Action dated Apr. 14, 2015, U.S. Appl. No. 13/544,802, filed Jul. 9, 2012.
Notice of Allowance dated Oct. 19, 2015, U.S. Appl. No. 13/544,802, filed Jul. 9, 2012.

* cited by examiner

PASSWORD RESET USING HASH FUNCTIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Systems utilized by corporations and government entities may require employees and/or users of the applications to use a password to gain access to the system. The password may give a user or a group of users access to some or all of a system based on login information, this password may expire and the system may require the user to reset the password within the bounds of various requirements as far as length and type of characters used.

SUMMARY

In an embodiment, a method of resetting passwords, comprising: sending, by a password application on a server, to a user application, a notification that a current password will expire in a predetermined time period; receiving, by a reset application on the server a request to reset at least one of a current password; and executing, by the reset application, a first hash function on at least one seed of a plurality of seeds comprising a password profile, wherein the at least one seed is a timestamp associated with the creation of the current password. The embodiment further comprising sending, by the reset application, to the user application, a first key; receiving, by the reset application, a second key; executing, by the reset application, a second hash function on the at least one seed; determining, by the reset application, if a third key generated by the second hash function executed on the at least one seed is substantially similar to the second key; permitting, by the reset application, a user account associated with the user application to access a reset environment, in response to a determination that the second hash function executed on the at least one seed is substantially similar to the second key; receiving, by the password application, a new password; and storing, by the password application, the new password and a timestamp associated with creation of the new password in the data store.

In an alternate embodiment, a method of resetting passwords, comprising: receiving, by a user application associated with a user account, a first notification from a password application on a server, based on a determination by the password application that as current password has expired, wherein the current password and a timestamp associated with the current password are stored in a data store on the server; sending, by the user application, a request for a new password to a reset application on the server; and receiving, by the user application from the reset application, a key, wherein the key is based on the reset application executing a first hash function on at least a timestamp associated with creation the current password. The embodiment further comprising receiving, by the user account, based on a determination by the reset application that a result of a second hash function executed on the timestamp associated with the current password is substantially similar to a second key received by the reset application, access to reset the current password; and entering, by the user account, a new password, wherein the new password is associated with a new timestamp, and wherein the new password and the new timestamp are stored in the data store.

In an embodiment, a system for resetting passwords, comprising: a memory; a processor; a password application and a reset application stored in the memory, wherein the password application, when executed by the processor: communicates with a data store, wherein the data store comprises a plurality of password profiles, wherein each password profile comprises a current password and a timestamp associated with the current password; and sends at least one notification to a user application based on a determination that at least one of the current password has expired or that a predetermined time period remains until the current password expires. The embodiment further comprising wherein the reset application, when executed by the processor: receives a request to change the current password; sends, to the user application, a first key based on a first hash function executed on at least the timestamp associated with the current password, wherein the first key is not stored on the server; receives a second key; executes a second hash function on the timestamp associated with the current password; determines if a result of the second hash function is substantially similar to the second key; receives, based upon the determination that the result of the second hash function is substantially similar to the second key, a new password; and stores the new password and a timestamp associated with the creation of the new password in the data store.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Corporations and other entities that manage and authorize access to computer systems and/or individual applications may grant access based upon a combination of components, for example, a userID and a password. This may occur when a user logs in to use a computer system by providing a userID and password when prompted by a login dialog box. The password used to access computer systems and/or individual applications may have an expiration date, after which the password may no longer be used for access. The password would then have to be reset in a secure manner that decreases the likelihood that an unauthorized party could gain access to the system. The systems and methods disclosed herein are related to resetting passwords in such a manner.

As used herein, the term "user application" may be used to refer to an actual application such as those used for email, short messaging service (SMS), and multimedia messaging service (MMS), it may also refer to a general access point such as a dialog box, that is, the term "user application" may refer to a specific application or the general manner in which a user enters and receives information, such as a dialog box or other prompt. In some embodiments, a user account may be referred to as being associated with the user application. In such instances, the user account may be representative of access to a plurality of programs and access points including dialog boxes and other prompts. This password, which may be referred to as a current password or as an active password, may initially be created by the user or by a system administrator. A plurality of users may have access to a system, an individual application, a suite of applications, or a portion of a system. This access may be based on a userID and a password associated with each user of the plurality of users. The access may be defined by a set of rules that allow/disallow users' access to a particular group of applications, a category of functionality, areas of a server, or other parts of a system. The user accessing the system may be an employee, a contractor, a temporary employee, or hold another type of position where he or she accesses information on the server in order to perform his or her job function(s). In some embodiments, only internal employees of a corporation or entity may use the system, and in alternate embodiments customers and third party vendors may also use the system. In an embodiment, a user's system access is based in part on a password that may expire at predetermined intervals. The user may be asked to set a new password prior to or upon the expiration of the current password. The user may not remember the intervals at which the current password expires, or may be out of the office on vacation or otherwise when the current password expires, and therefore may end up locked out of the system and involve a system administrator or perform another series of tedious tasks in order to regain access to the system.

The system may be designed to remind the user to change his or her password. A user may access the system using a device owned by the company or owned by the user. This device may be a desktop computer, kiosk, terminal, laptop computer, other personal computing device, personal digital assistant (PDA), tablet, mobile device, smartphone, or other mobile phone. In an embodiment, a user application such as email or another messaging system may receive periodic notifications at predetermined intervals from a password application on a server to remind the user to change his or her password. For example, if the current password is live/active for six months from the time it is created, a first notification may be sent a month prior to expiration. In an embodiment, subsequent notifications may be sent as follows: a second notification may be sent two weeks prior to expiration, a third notification sent a week before expiration, and a fourth notification sent twenty-four hours before expiration. It is understood that each subsequent notification is sent based upon the current password not being changed during the time that has passed since the previous notification. In alternate embodiments, there may be additional or different notifications sent at different intervals. In one example, the user may be able to set when the notifications will be received, what device the notifications will be received on, and in another example these settings may be determined by the system administrator.

In some embodiments, upon expiration of the current password, an additional notification may be sent to the user application. The user application may be, for example, the user's email account. The plurality of notifications may be sent in the form of an email, text message, short messaging service (SMS), audio notification and/or voicemail. Combinations of notification types may also be utilized, and this may be a preference that is set by the user or by the system administrator. The notification(s) sent prior to or subsequent to the password's expiration may contain a link that, when clicked on by the user, initiates the generation of a key using a one-way secure cryptographic hash function. The key may be presented to the user on a display, and the use may enter that key as a password in a dialog box. The system, after validating the entered key, may grant limited access to the computer system to the user, for example access to set a new password. This key may be generated from seeds (seed values) as discussed in detail below.

The hash function may be executed by a reset application on the server that is in communication with at least one of a password application or the user application. Hash functions may be provided by, for example, an operating system or a software development kit. These hash functions may be called when a link sent in the notifications discussed herein is activated. When a hash function is called, information such as (a) how long the output hash value is to be, for example, how many numbers, characters, letters, and combinations thereof are to be used and/or the overall length of the hash value, (b) one or more seed values may be provided as arguments when invoking the hash function. The hash functions may be those such as ECOH, FSM, GOST, HAS-160, NAVAL, JH, MD2, MD4, MD5, MD6, SHA-1, SHA-2, SHA-3, or other cryptographic hash functions as known in the art.

As discussed herein, hash functions are used to generate a key that may allow a user limited access to the system in order to reset his or her current password. It is understood that the methods disclosed herein may not be utilized to gain full system access, but rather to gain access to a portion of the system where the user's current password can be reset. Subsequently, using that new password, the user may have access to additional portions of the system as defined by the system administrator and/or based on a user privilege level associated with the user. The set of rules that govern a user's access may be based upon a user profile comprising the user name, title, division, contact information, education, certifications, and other factors as deemed appropriate depending upon the user's purpose and role in accessing the system.

The hash functions may be executed on at least one seed value such as a timestamp associated with when the current password was created. In some embodiments, a plurality of seed values such as the userID and current timestamp may be used in addition to the timestamp associated with when the current password was created. In an embodiment, the current password as well as the timestamp of when it was created may be stored in a password profile in a data store on a server associated with the computer system and/or application accessed by users. In other embodiments, the password profile also comprises seeds such as a userID, a plurality of previously used passwords, or combinations thereof. Depending upon the embodiment, the timestamp associated with the current password may comprise the date and/or the time at which the current password was created. A characteristic of a secure one-way hash function is that it is mathematically intractable and/or impossible to determine the seeds used to generate a hash value based on the hash value itself. As such, given only a hash value, the seed(s) such as the timestamp, userID, or other values cannot be determined. This means that no user, system administrator, or application can reverse the hash to determine the seed value(s).

In some embodiments, the current password may be part of the password profile. As discussed above, the password profile may comprise not only the current password, but a history of former passwords and data associated with the creation, use, and expiration of the passwords. When a password is created by a user, by the system, or by a system administrator, a timestamp of when the password was created is associated with that password and both the current password and timestamp are stored in the password profile. This timestamp may be referred to as the current password timestamp or as the timestamp associated with the current password. When a user wants to change his or her current password, the link sent in one of the notifications discussed above may be used to initiate the hash executions discussed herein. In an embodiment, the user may also change their password prior to receiving any notifications. In an alternate embodiment, the user changes a recently expired password, that is, a password that was the last current, active password that has expired but where the account associated with the password may not have been locked. In an alternate embodiment, the password has expired but the link sent in the expiration notification or previous notifications may still be active for a predetermined period of time either from the time the notification was sent or from the time the current password expired.

A first key may be generated by the reset application when a first hash function is executed as discussed below. This first key may be sent to the user application by the reset application, and the user application may send a second key back to the reset application. For example, the first key is presented on a display to the user, and the user enters the value of that first key in a password field of a login dialog box (the user input may be referred to as a second key). In an alternate embodiment, the first key is embedded into a custom URL/link that may be received, for example, by email. In that embodiment, the user clicks on the link instead of re-entering the key in order to reduce the possibility of error upon reentry.

It is appreciated that the user logs in separately to the email system and that there is a level of security in place in order to send the hash value to the user. It is also appreciated that the second key should be the same as the first key, but may be referred to herein as the second key to illustrate that the first key may be entered incorrectly. The first key may be generated based upon the execution of a one-way secure hash function, and may expire after a predetermined time period. The first hash function may be performed on a portion of the password profile, that is, on at least one seed.

In an embodiment, the first hash function is executed on the timestamp associated with when the current password was created. In alternate embodiments, the first hash function may be executed using a different seed from a password profile or using multiple seeds. The first key is sent to the user application, for example, an email application, and the user enters the information into a password field of a login dialog box as a second key, and the login dialog box sends the second key back. It is appreciated that the second key should be substantially the same as the first key. The reset application may then receive input, i.e. the second key, from the login dialog and perform a second hash function on the timestamp associated with the current password. The result of the second hash function, which may be referred to as a third key, is then compared to the second key received by the reset application to determine if the two are substantially similar. If the comparison is successful, the user account associated with the user application (i.e. the email application) may be granted access to a portion of the system to reset the current password to a new password. If the comparison is not successful, the user may be sent a notification and may subsequently re-enter the second key, and/or a system administrator may be notified. In some embodiments, if the comparison fails a predetermined number of times, the userID may be flagged for review and/or the account associated with that userID and current password may be locked.

If a new password is set, a new timestamp associated with the creation of the new password is created and stored in the password profile. As such, if the key sent after the first hash is used to attempt to reset the password after a new password has been created, a comparison of this key, which was generated based upon the timestamp of the former password, to the timestamp associated with the new password will fail. In the event of a failure, the reset application may send a notification to the user application and/or the system administrator and the associated account may be flagged.

Figure 1:
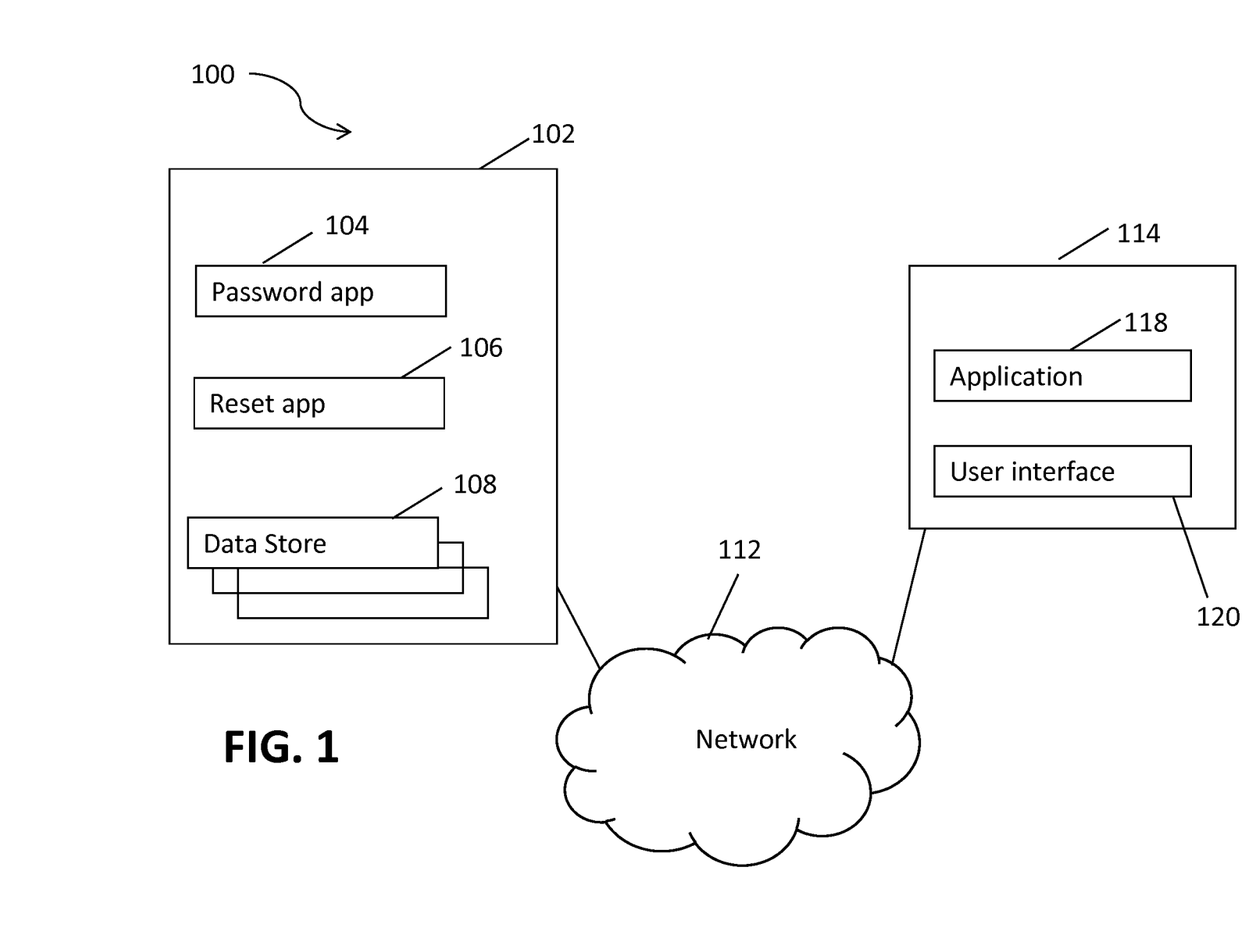
FIG. 1 is a system diagram of a system that may be capable of executing embodiments according to the present disclosure.

FIG. 1 is an illustration of a system 100 that may be suitable for implementing embodiments of the present disclosure. System 100 comprises a server 102, a network 112, and a user device 114 that comprises a user interface 120. The server 102 may be associated with a corporation or may be associated with a third party contractor of the corporation. The server 102 comprises a password application 104, a reset application 106, and a plurality of data stores 108. The plurality of data stores 108 may store a plurality of password profiles, for example, each password profile may be associated with a different user. In an embodiment, each password profile of the plurality of password profiles may comprise a userID, a current password, a timestamp associated with when the current password was created/generated, a plurality of access rights, and a plurality of previously used passwords.

The password application 104 may be in communication with a user application 118 on the user device 114. In an alternate embodiment, not shown in FIG. 1, the user application 118 may reside on a different server and may be accessed by the user device 114. The password application 104 may retrieve information from the data store(s) 108 in order to determine if a current password associated with an account is about to expire or has expired. A current password may be valid for a predetermined period of time, a predetermined number of uses, or combinations thereof. In an embodiment, the password application 104 determines that a current password will expire at a predetermined time on a predetermined day and sends a plurality of notifications to the user application 118. The plurality of notifications may be sent separately at predetermined time intervals. These intervals may be preferences set by a user or by a system administrator.

In one embodiment, a first notification may be sent to the application 118 by the password application 104 at a first predetermined time period from the expiration of the current password. The first notification may be sent as an email notification, a text notification, a short messaging service (SMS), audio message, or voicemail to indicate that the current password will expire in thirty days. If the current password is not reset within a predetermined time period after the first notification is sent, the password application 104 may send a second notification after a second predetermined time period, and may send subsequent notifications until the current password expires.

In an embodiment, the password application 104 may also send a notification when the current password has expired. At least some of the notifications comprise a link that puts the user device 114 in communication with the reset application 106. In an embodiment, if a predetermined time passes after the current password expires, the account associated with the current password may be locked and/or flagged and a system administrator may be notified.

The reset application 106, as discussed below, performs a one-way secure cryptographic hash function. This hash function may be executed in response to a link sent to a user being activated (i.e. clicked on). It is understood that, as used herein, the term "current password" refers to a password that is active or expired, until a new password has been set. The hash function may be executed, for example, on at least the timestamp associated with the current password from the password profile. When a notification is sent to the user application 118 by the password application 104, the user may ignore the notification or reset the current password using the user application 118.

The notification may comprise a link that, when activated, sends an instruction to the reset application 106 to execute a one-way secure cryptographic hash on password profile information associated with the userID of the user of the user application 118. If the user ignores the notification(s) until the password expires, and the instruction is therefore not sent to the reset application 106 until after the current password has expired, the same one-way secure cryptographic hash may be performed as discussed above. The hash, which may be referred to as the first hash, generates a first key that may then be sent to the user application 118. The user application 118 may reside on or be accessible by the user device 114. The user device 114 may be a personal digital assistant, computer terminal, kiosk, personal computer, laptop computer, tablet, portable electronic device, a mobile phone, or other device capable of hosting the user application 118.

After the user application 118 receives the first key, it may transmit/communicate a key, referred to as the second key, to the reset application 106. The second key should be substantially similar to or the same as the first key, but the reset application determines if this is the case before allowing the user application 118 or the user access to the password reset portion or any other portion of the system. As such, the key received by the user application 118 is referred to herein as the first key and the key sent by the user application 118 after receiving the first key is referred to as the second key. Once the second key is received by the reset application 106, the reset application 106 executes a hash function on the timestamp associated with the current password. This hash function may be referred to as the second hash function. The reset application 106 determines if there is a substantial similarity between the second key and the result of the second hash function, which may be referred to as a third key. If there is a match, the user may be granted access to only the portion of the system that allows for resetting of the password. In contrast, an active (valid) password may allow the user/user device 114/user application 118 access to other functional areas of the system as defined by the plurality of access rights. If there is not a match, a notification may be sent to the user device and/or the system administrator, and/or the user device may be prompted to enter the password again. In some embodiments, after a predetermined number of failed attempts at entering the key, the user device and/or userID may be flagged or rendered unusable by the system and the user notified as such.

If there is a match, the user may enter a new password in the limited-access environment. When a new password is created, it is stored on the password profile in the data store 108. A new timestamp associated with the creation of the new password is also stored in the password profile in the data store 108. The hashed values from the first hash and the second hash are not stored and may not be used again. In an embodiment, the hashed values are at least 32 characters long. In alternate embodiments, the hashed values may be longer or shorter depending upon the hash function utilized and/or the seed values.

In an embodiment, a second key is sent from the user application 118 to the reset application 106 immediately upon a first key being received by the user application. In another embodiment, a second key is not sent from the user application 118 to the reset application 106 immediately upon a first key being received by the user application. In this embodiment, the first key sent to the user application 118 from the reset application is only active, that is, can only be entered and be recognized by the reset application 106 for a predetermined period of time. If the first key is not used within this predetermined period of time (i.e. if it is not entered as the second key), a notification may be sent to the user application 118 and/or the system administrator that the key is no longer valid. In an alternate embodiment, the reset application 106 may send at least one reminder to the user application 118 that the key is a predetermined number of days from expiring. The hash values generated after the first hash and the second hash are not stored in the password profile or otherwise on the server. As discussed in more detail below, the keys are intended to be single-use. In an alternate embodiment, the link may be sent using email, and once the link is activated the first key is generated, sent to the user, and the user keys it into a dialog box that may not be associated with the user application 118. The systems described herein are understood to have "stateful" components, that is, the components retain information. For example, a login facility such as a single sign-on system or a login facility provided by an operating system (e.g., UNIX operating system) may create and store information about a user and/or the user's login password and userID. The results and use of the hash functions and the new functionality discussed herein, however, are stateless. This means that the results of the hash functions discussed in the disclosed embodiments of systems and methods are not stored by any application involved in the method and/or system.

In some embodiments, a notification may be sent to a user when a password associated with the user's account has been changed. This notification may be sent, for example, by way of SMS, MMS, or email, to alert the user of the change in part to remind the user and in part to ensure that it was in fact the user associated with the account that changed the password. If a user were to receive a notification that their password has been changed and was not the party that changed the password, the user would then have the opportunity to notify the system administrator.

Figure 2:
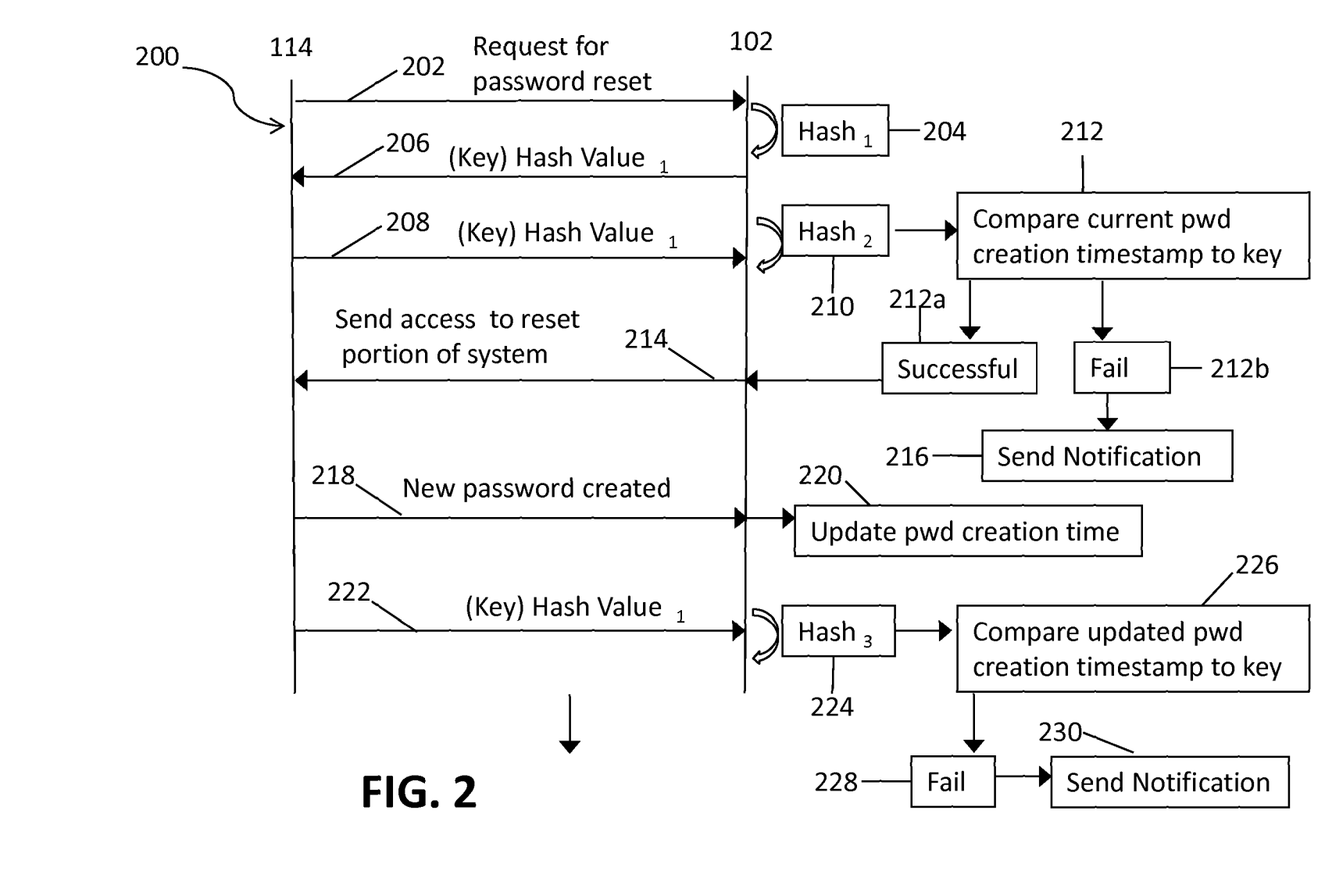
FIG. 2 is a message sequence diagram illustrating methods according to embodiments of the present disclosure.

FIG. 2 is a diagram of a method 200 of resetting passwords according to embodiments of the present disclosure. In method 200, the device 114 and the server 102 as discussed above in FIG. 1 are in communication. At block 202, a request for a new password is sent from the device 114, for example, by way of the application 118 to the server 102. As discussed above, this request may be in response to a notification or a series of notifications sent from the server 102 to the application 118, for example, by the password application 104. The reset application 106 executes a hash at block 204. The hash function is executed at block 204 using at least one seed, that is, at least one component associated with a password profile of the user. The password profile may comprise a userID, access rights, a current password, a timestamp that reflects the time at which the current password was created ("the timestamp"), and a plurality of previously used passwords. In an embodiment, the hash function executed at block 204 is executed on the timestamp associated with the current password.

In some embodiments, the password profile my also comprise a record of correct and/or incorrect login attempts. The hash performed at block 204 may be executed on the timestamp associated with the current password. The first key resulting from the secure, one-way cryptographic hash at block 204 may be sent to the user device 114 at block 206. At block 208, a second key is received by the reset application 106. It is understood that the second key should be the same as the first key if the first key is correctly received by the user application 118 and then input by the user application 118, but that it is referred to as a "second key" to distinguish it from the first key generated by the first hash function at block 204, in case the key entered at block 206 is not the same generated at block 204.

At block 210, a second hash function is performed on the timestamp associated with the current password. At block 212, an application on the server 102, for example, the reset application 106 performs a comparison of the second key received at block 208 and the result of the second hash function performed at block 210. If there is a match (212a), the method proceeds to block 214. If there is not a match (212b) the method proceeds to block 216. A failed comparison at block 212b may be the result of a user error in entering the second key at block 208, or as the result of an unauthorized party attempting to gain access, or as the result of the expiration of the first key. At block 216, a notification is sent to at least one of the user device 114 and a system administrator to indicate that there was a failed attempt or to allow the user another attempt to reenter the key at block 208.

At block 214, in response to a successful comparison at block 212a, the device 114 is granted access to the part of the server 102 that enables the resetting of passwords. That is, a successful comparison does not allow the user full access to the server 102, but is rather a gateway for that user to reset his or her password at block 218. When the new password is created at block 218, it is stored as the current password in the password profile and the timestamp is changed at block 220 in the password profile to reflect the time at which the new password was created.

At block 222, if the key sent at block 206 is entered (after the creation of a new password), a third hash function is performed at block 224. This third hash function is executed on a timestamp associated with the current password, where the current password is the new password created at block 218. As such, when the results of the third hash are compared at block 226 to the key entered at block 222, and the comparison fails at block 228 since the key was created based upon the first hash executed at block 204 on the timestamp associated with the now-former password. At block 230, a notification may be sent to the system administrator indicating that there was an attempt at using the key sent at block 206. The results of the hash functions at blocks 204 and 210 are not saved in the password profile, these results are generated for password restoration/authentication purposes and are not stored, and the same can be said for the results of the third hash at block 224.

Figure 3:
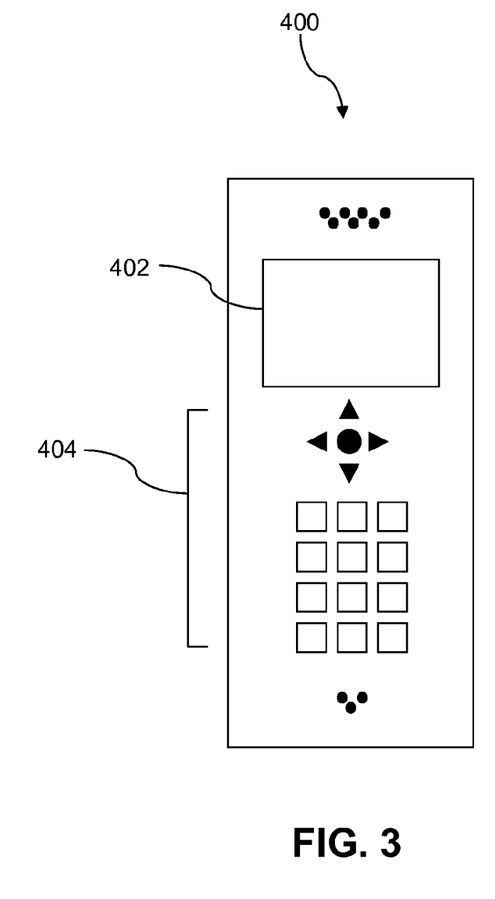
FIG. 3 depicts a mobile device which may be operable for implementing embodiments of the present disclosure.

FIG. 3 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 4:
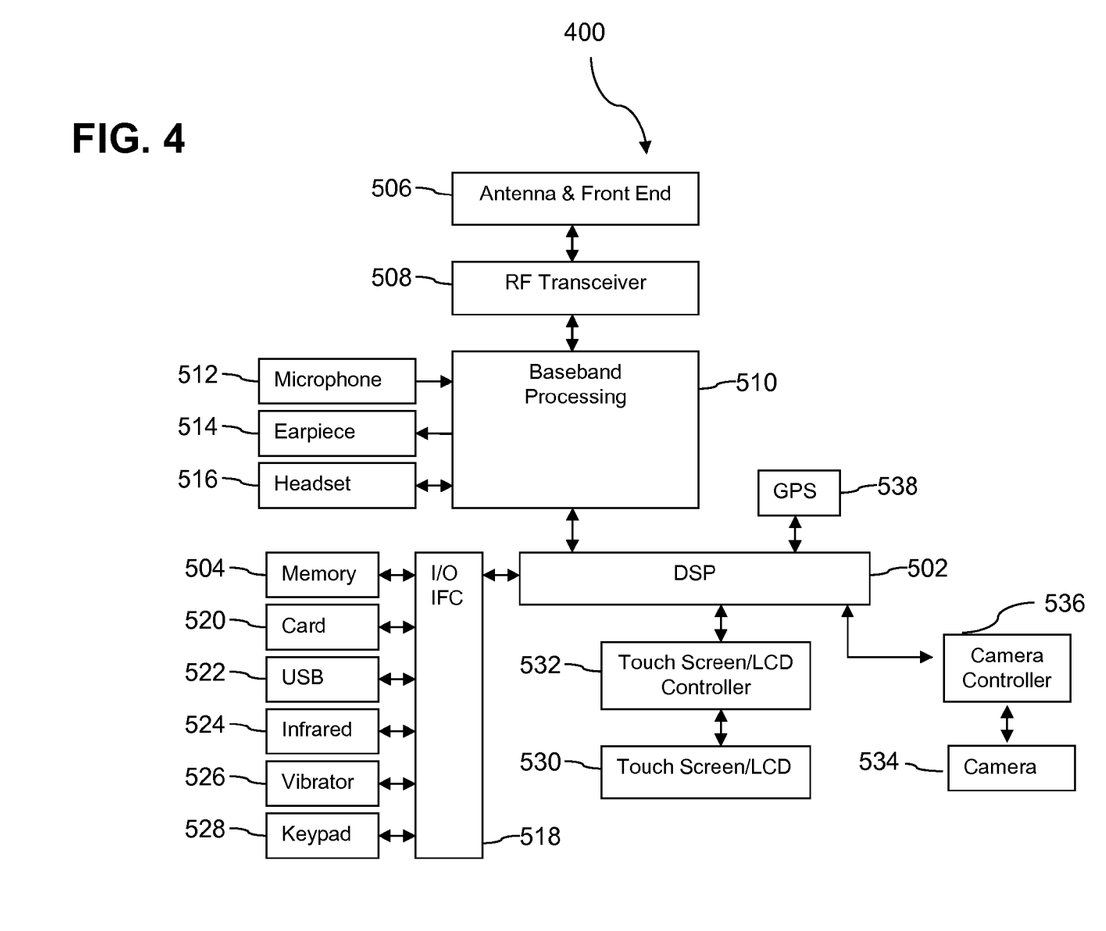
FIG. 4 shows a block diagram of a mobile device which may be operable for implementing embodiments of the present disclosure.

FIG. 4 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figures 5A, 5B:
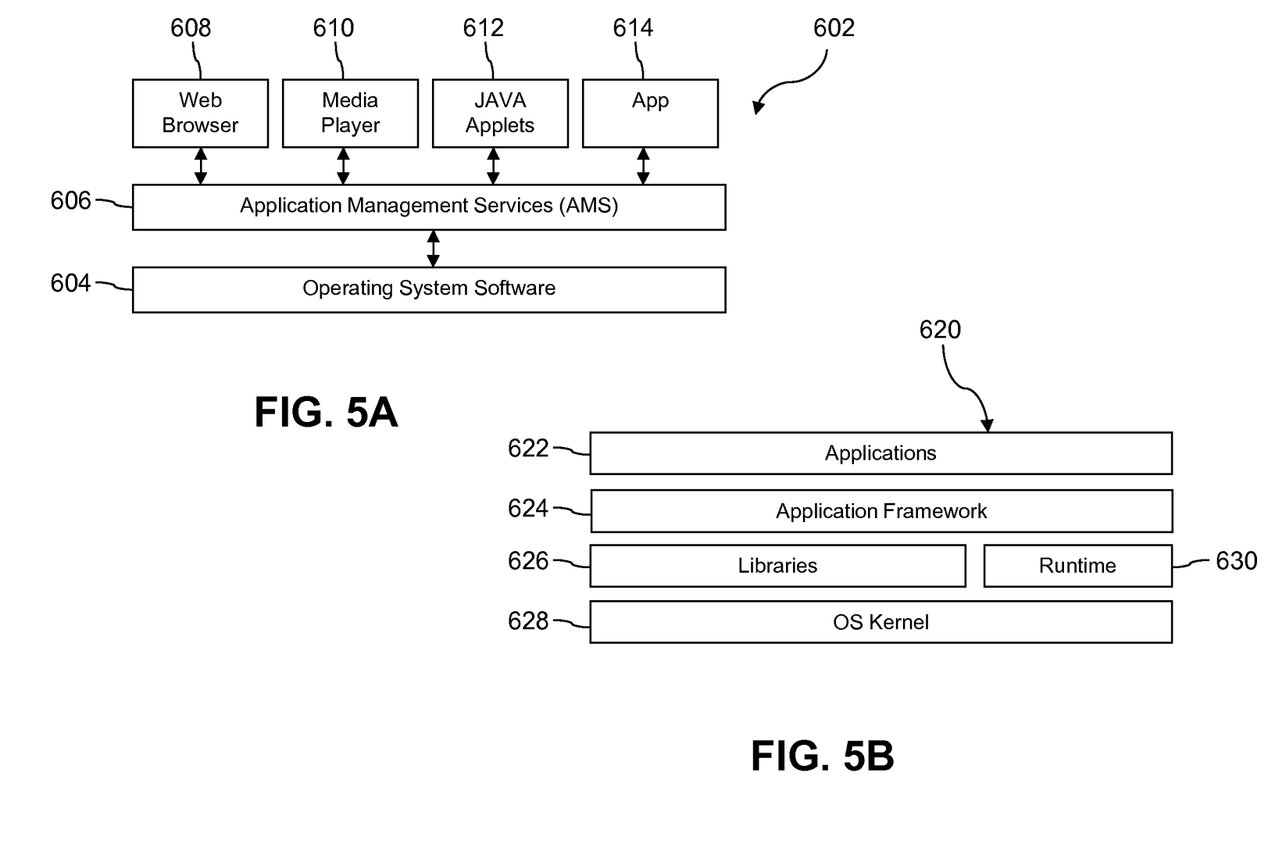
FIG. 5A illustrates a software environment that may be capable of implementing embodiments of the present disclosure.
FIG. 5B illustrates an alternative software environment that may be capable of implementing embodiments of the present disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 5A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. In an embodiment, an application 614 may be in communication with the user application 118 discussed in FIG. 1 in order to reset the password as discussed above. In some embodiments, the application 614 may be the reset application 106, and in other embodiments it may be the password application 104.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
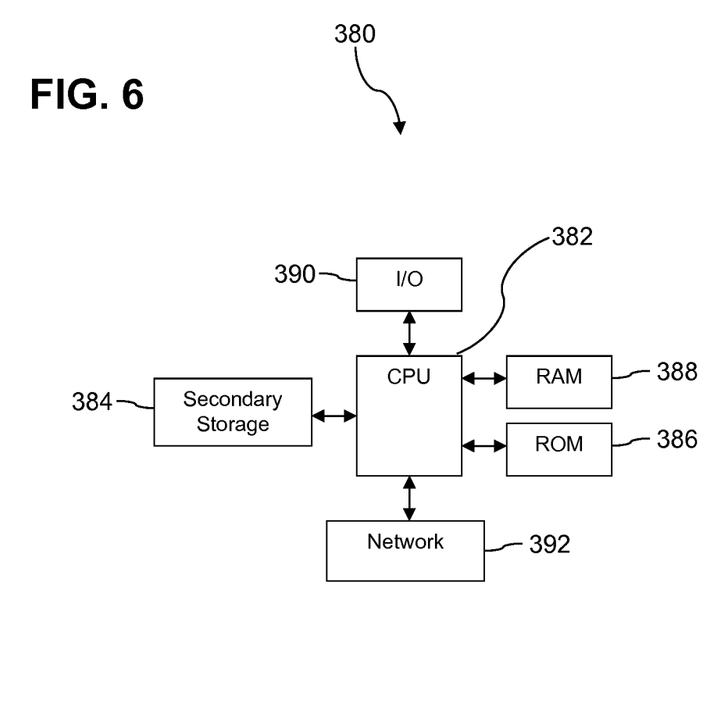
FIG. 6 illustrates a computer system that may be capable of implementing embodiments of the present disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer specification 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of resetting passwords, comprising:
sending, by a password application on a server, to a user application, a notification that a current password will expire in a predetermined time period;
receiving, by a reset application on the server a request to reset of a current password;
executing, by the reset application, a first hash function on at least one seed of a plurality of seeds comprising a password profile, wherein the at least one seed is a timestamp of when the current password was created;
sending, by the reset application, to the user application, a first key;
receiving, by the reset application, a second key;
executing, by the reset application, a second hash function on the at least one seed;
determining, by the reset application, if a third key generated by the second hash function executed on the at least one seed is similar to the second key;
permitting, by the reset application, a user account associated with the user application to access a reset environment, in response to a determination that the third key generated by the second hash function executed on the at least one seed is similar to the second key;
receiving, by the password application, a new password; and storing, by the password application, the new password and a timestamp of when the new password was created in the data store.

2. The method of claim 1, wherein the plurality of seeds further comprise a userID, a user name, a plurality of user contact information, a timestamp associated with expiration of the first key, and a plurality of previously used passwords.

3. The method of claim 2, wherein the password profile does not comprise the first key or the second key.

4. The method of claim 1, further comprising:
receiving, by the reset application, subsequent to the password application receiving the new password, the second key; and
executing, by the reset application, a third hash function on the timestamp associated with the new password.

5. The method of claim 4, further comprising: determining, by the reset application, if the result of the hash function executed on the timestamp associated with the new password is similar to the second key.

6. The method of claim 5, further comprising: sending, by the reset application, a notification in response to a determination that the result of the hash function executed on the timestamp associated with the new password is not similar to the second key.

7. The method of claim 6, further comprising: sending, by the reset application, in response to a determination that the result of the hash function executed on the timestamp associated with the new password is not similar to the second key, a request to resubmit the second key.

8. The method of claim 7, further comprising: locking a user account in response to the determination that the result of the hash function executed on the timestamp associated with the new password is not similar to the second key.

9. A method of resetting passwords, comprising:
receiving, by a user application associated with a user account, a first notification from a password application on a server, based on a determination by the password application that a current password has expired, wherein the current password and a timestamp of when associated with the current password was created are stored in a data store on the server;
sending, by the user application, a request for a new password to a reset application on the server;
receiving, by the user application from the reset application, a key, wherein the key is based on the reset application executing a first hash function on at least the timestamp of when the current password was created;
receiving, by the user account, based on a determination by the reset application that a result of a second hash function executed on the timestamp associated with the current password is similar to a second key received by the reset application, access to reset the current password;
and entering, by the user account, a new password wherein the new password and a new timestamp of when the new password was created are stored in the data store.

10. The method of claim 9, wherein a plurality of password profiles are stored in the data store on the server, wherein each password profile of the plurality of password profiles comprises a userID, the current password, and the timestamp associated with the current password's creation.

11. The method of claim 10, wherein each password profile of the plurality of password profiles further comprises a user name, user contact information, and a plurality of previously used passwords.

12. The method of claim 11, further comprising receiving, by the user application, after a second predetermined period of time, a second notification that the current password is set to expire.

13. The method of claim 12, wherein the second predetermined period of time is less than the first predetermined period of time.

14. The method of claim 13, further comprising receiving a third notification that the current password is expired.

15. A system for resetting passwords, comprising:
a memory;
a processor;
a password application and a reset application stored in the memory;
wherein the password application, when executed by the processor:
communicates with a data store, wherein the data store comprises a plurality of password profiles, and wherein each password profile comprises a current password and a timestamp of when the current password was created;
sends at least one notification to a user application based on a determination that at least one of the current password has expired or that a predetermined time period remains until the current password expires;
wherein the reset application, when executed by the processor:
receives, a request to change the current password;
sends, to the user application, a first key based on a first hash function executed on at least the timestamp of when the current password was created, wherein the first key is not stored on the server;
receives a second key;
executes a second hash function on the timestamp of when the current password was created;
determines if a result of the second hash function is similar to the second key;
receives, based upon the determination that the result of the second hash function is similar to the second key, a new password;
and stores the new password and a timestamp of when the new password was created in the data store.

16. The system of claim 15, wherein the password profile comprises a userID, a user name, a user contact information, the new password, the timestamp associated with the new password, a timestamp associated with expiration of the first key, and a plurality of previously used passwords.

17. The system of claim 16, wherein the password profile does not comprise the first key or the second key.

18. The system of claim 15, wherein the user application resides on a user device, wherein the user device is one of a kiosk, a personal computer, a laptop computer, a portable electronic device, a personal digital assistant, a tablet, a mobile phone, or combinations thereof.

19. The system of claim 18, wherein the user application resides on the server and is accessed by the user device.

20. The system of claim 19, wherein the user device comprises an interface application that is in communication at least one of the password application and the reset application.

* * * * *